(12) United States Patent
Dawson et al.

(10) Patent No.: US 8,650,341 B2
(45) Date of Patent: Feb. 11, 2014

(54) METHOD FOR CAN CONCATENATING CAN DATA PAYLOADS

(75) Inventors: Steven G. Dawson, Chandler, AZ (US); Tim L. Wilson, Chandler, AZ (US); Joseph W. Triece, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 917 days.

(21) Appl. No.: 12/758,448

(22) Filed: Apr. 12, 2010

(65) Prior Publication Data

US 2011/0007759 A1     Jan. 13, 2011

Related U.S. Application Data

(60) Provisional application No. 61/171,891, filed on Apr. 23, 2009.

(51) Int. Cl.
*G06F 3/00* (2006.01)
*G06F 5/00* (2006.01)

(52) U.S. Cl.
USPC ............................................. 710/52; 710/38

(58) Field of Classification Search
None
See application file for complete search history.

(56) References Cited

U.S. PATENT DOCUMENTS

| | | | | |
|---|---|---|---|---|
| 5,398,241 A | * | 3/1995 | Witchey | 370/391 |
| 6,430,183 B1 | * | 8/2002 | Satran et al. | 370/389 |
| 7,046,686 B1 | | 5/2006 | Tompkins et al. | 370/412 |
| 2002/0006212 A1 | | 1/2002 | Rhoads et al. | 382/100 |
| 2002/0120851 A1 | * | 8/2002 | Clarke | 713/178 |
| 2003/0056016 A1 | * | 3/2003 | Bartling | 709/250 |
| 2003/0164826 A1 | * | 9/2003 | Lavelle et al. | 345/419 |
| 2004/0151176 A1 | | 8/2004 | Burton et al. | 370/389 |
| 2005/0251701 A1 | * | 11/2005 | Fredriksson | 713/500 |
| 2006/0059117 A1 | | 3/2006 | Tolson et al. | 1/1 |
| 2009/0010279 A1 | | 1/2009 | Tsang et al. | 370/468 |

FOREIGN PATENT DOCUMENTS

CN     102456240 A     5/2012     ............... G07C 5/00

OTHER PUBLICATIONS

CAN Specification, 1991, V2.0.*
International PCT Search Report and Written Opinion, PCT/US2010/031864, 18 pages, Mailed Jul. 14, 2010.
Chinese Office Action, Application No. 201080009764.7, 8 pages, Oct. 31, 2013.

* cited by examiner

*Primary Examiner* — Idriss N Alrobaye
*Assistant Examiner* — Ronald Modo
(74) *Attorney, Agent, or Firm* — King & Spalding L.L.P.

(57) ABSTRACT

A controller area network (CAN) controller unit has a message assembly buffer receiving a serial bitstream, a buffer memory coupled in parallel with said message assembly buffer, a CAN control unit coupled with the message assembly and the buffer memory, and at least one control register. The at least one control register can be programmed to cause the CAN control unit to store a message received in the message assembly register in at least a first and second mode, wherein in the first mode, control information and data payload of the received CAN message are stored in the buffer memory and in the second mode only the data payload of the CAN message is stored in the buffer memory.

25 Claims, 9 Drawing Sheets

Standard Message:

Extended Message:

Figure 4

| ADDRESS OFFSET | NAME | | BIT 31/23/15/7 | BIT 30/22/14/6 | BIT 29/21/13/5 | BIT 28/20/12/4 | BIT 27/19/11/3 | BIT 26/18/10/2 | BIT 25/17/9/1 | BIT 24/16/8/0 |
|---|---|---|---|---|---|---|---|---|---|---|
| 00 | CMSG0SID | 31:24 | ---- | ---- | ---- | ---- | ---- | ---- | ---- | ---- |
| | | 23:16 | ---- | ---- | ---- | ---- | ---- | ---- | ---- | ---- |
| | | 15:8 | ---- | ---- | ---- | ---- | ---- | SID[10:8] | | |
| | | 7:0 | SID[7:0] | | | | | | | |
| 04 | CMSG0EID | 31:24 | ---- | ---- | SRR | IDE | EID[17:14] | | | |
| | | 23:16 | EID[13:6] | | | | | | | |
| | | 15:8 | EID[5:0] | | | | | | RTR | RB1 |
| | | 7:0 | ---- | ---- | ---- | RB0 | DLC[3:0] | | | |
| 08 | CMSG0DATA0 | 31:24 | TRANSMIT BUFFER DATA BYTE 3 | | | | | | | |
| | | 23:16 | TRANSMIT BUFFER DATA BYTE 2 | | | | | | | |
| | | 15:8 | TRANSMIT BUFFER DATA BYTE 1 | | | | | | | |
| | | 7:0 | TRANSMIT BUFFER DATA BYTE 0 | | | | | | | |
| 0C | CMSG0DATA1 | 31:24 | TRANSMIT BUFFER DATA BYTE 7 | | | | | | | |
| | | 23:16 | TRANSMIT BUFFER DATA BYTE 6 | | | | | | | |
| | | 15:8 | TRANSMIT BUFFER DATA BYTE 5 | | | | | | | |
| | | 7:0 | TRANSMIT BUFFER DATA BYTE 4 | | | | | | | |
| 10 | CMSG1SID | 31:24 | ---- | ---- | ---- | ---- | ---- | ---- | ---- | ---- |
| | | 23:16 | ---- | ---- | ---- | ---- | ---- | ---- | ---- | ---- |
| | | 15:8 | ---- | ---- | ---- | ---- | ---- | SID[10:8] | | |
| | | 7:0 | SID[7:0] | | | | | | | |
| 14 | CMSG1EID | 31:24 | ---- | ---- | SRR | IDE | EID[17:14] | | | |
| | | 23:16 | EID[13:6] | | | | | | | |
| | | 15:8 | EID[5:0] | | | | | | RTR | RB1 |
| | | 7:0 | ---- | ---- | ---- | RB0 | DLC[3:0] | | | |
| 18 | CMSG1DATA0 | 31:24 | TRANSMIT BUFFER DATA BYTE 3 | | | | | | | |
| | | 23:16 | TRANSMIT BUFFER DATA BYTE 2 | | | | | | | |
| | | 15:8 | TRANSMIT BUFFER DATA BYTE 1 | | | | | | | |
| | | 7:0 | TRANSMIT BUFFER DATA BYTE 0 | | | | | | | |
| 1C | CMSG1DATA1 | 31:24 | TRANSMIT BUFFER DATA BYTE 7 | | | | | | | |
| | | 23:16 | TRANSMIT BUFFER DATA BYTE 6 | | | | | | | |
| | | 15:8 | TRANSMIT BUFFER DATA BYTE 5 | | | | | | | |
| | | 7:0 | TRANSMIT BUFFER DATA BYTE 4 | | | | | | | |

Figure 5

| ADDRESS OFFSET | NAME | | BIT 31/23/15/7 | BIT 30/22/14/6 | BIT 29/21/13/5 | BIT 28/20/12/4 | BIT 27/19/11/3 | BIT 26/18/10/2 | BIT 25/17/9/1 | BIT 24/16/8/0 |
|---|---|---|---|---|---|---|---|---|---|---|
| 00 | CMSG0SID | 31:24 | CMSGTS[15:8] | | | | | | | |
| | | 23:16 | CMSGTS[7:0] | | | | | | | |
| | | 15:8 | FILHIT[4:0] | | | | | SID[10:8] | | |
| | | 7:0 | SID[7:0] | | | | | | | |
| 04 | CMSG0EID | 31:24 | ---- | ---- | SRR | IDE | EID[17:14] | | | |
| | | 23:16 | EID[13:6] | | | | | | | |
| | | 15:8 | EID[5:0] | | | | | | RTR | RB1 |
| | | 7:0 | ---- | ---- | ---- | RB0 | DLC[3:0] | | | |
| 08 | CMSG0DATA0 | 31:24 | RECEIVE BUFFER DATA BYTE 3 | | | | | | | |
| | | 23:16 | RECEIVE BUFFER DATA BYTE 2 | | | | | | | |
| | | 15:8 | RECEIVE BUFFER DATA BYTE 1 | | | | | | | |
| | | 7:0 | RECEIVE BUFFER DATA BYTE 0 | | | | | | | |
| 0C | CMSG0DATA1 | 31:24 | RECEIVE BUFFER DATA BYTE 7 | | | | | | | |
| | | 23:16 | RECEIVE BUFFER DATA BYTE 6 | | | | | | | |
| | | 15:8 | RECEIVE BUFFER DATA BYTE 5 | | | | | | | |
| | | 7:0 | RECEIVE BUFFER DATA BYTE 4 | | | | | | | |
| 10 | CMSG1SID | 31:24 | CMSGTS[15:8] | | | | | | | |
| | | 23:16 | CMSGTS[7:0] | | | | | | | |
| | | 15:8 | FILHIT[4:0] | | | | | SID[10:8] | | |
| | | 7:0 | SID[7:0] | | | | | | | |
| 14 | CMSG1EID | 31:24 | ---- | ---- | SRR | IDE | EID[17:14] | | | |
| | | 23:16 | EID[13:6] | | | | | | | |
| | | 15:8 | EID[5:0] | | | | | | RTR | RB1 |
| | | 7:0 | ---- | ---- | ---- | RB0 | DLC[3:0] | | | |
| 18 | CMSG1DATA0 | 31:24 | RECEIVE BUFFER DATA BYTE 3 | | | | | | | |
| | | 23:16 | RECEIVE BUFFER DATA BYTE 2 | | | | | | | |
| | | 15:8 | RECEIVE BUFFER DATA BYTE 1 | | | | | | | |
| | | 7:0 | RECEIVE BUFFER DATA BYTE 0 | | | | | | | |
| 1C | CMSG1DATA1 | 31:24 | RECEIVE BUFFER DATA BYTE 7 | | | | | | | |
| | | 23:16 | RECEIVE BUFFER DATA BYTE 6 | | | | | | | |
| | | 15:8 | RECEIVE BUFFER DATA BYTE 5 | | | | | | | |
| | | 7:0 | RECEIVE BUFFER DATA BYTE 4 | | | | | | | |

| ADDRESS OFFSET | NAME | | BIT 31/23/15/7 | BIT 30/22/14/6 | BIT 29/21/13/5 | BIT 28/20/12/4 | BIT 27/19/11/3 | BIT 26/18/10/2 | BIT 25/17/9/1 | BIT 24/16/8/0 |
|---|---|---|---|---|---|---|---|---|---|---|
| 00 | CMSG0DATA0 | 31:24 | RECEIVE BUFFER DATA BYTE 3 ||||||||
|  |  | 23:16 | RECEIVE BUFFER DATA BYTE 2 ||||||||
|  |  | 15:8 | RECEIVE BUFFER DATA BYTE 1 ||||||||
|  |  | 7:0 | RECEIVE BUFFER DATA BYTE 0 ||||||||
| 04 | CMSG0DATA1 | 31:24 | RECEIVE BUFFER DATA BYTE 7 ||||||||
|  |  | 23:16 | RECEIVE BUFFER DATA BYTE 6 ||||||||
|  |  | 15:8 | RECEIVE BUFFER DATA BYTE 5 ||||||||
|  |  | 7:0 | RECEIVE BUFFER DATA BYTE 4 ||||||||
| 08 | CMSG1DATA0 | 31:24 | RECEIVE BUFFER DATA BYTE 3 ||||||||
|  |  | 23:16 | RECEIVE BUFFER DATA BYTE 2 ||||||||
|  |  | 15:8 | RECEIVE BUFFER DATA BYTE 1 ||||||||
|  |  | 7:0 | RECEIVE BUFFER DATA BYTE 0 ||||||||
| 0C | CMSG1DATA1 | 31:24 | RECEIVE BUFFER DATA BYTE 7 ||||||||
|  |  | 23:16 | RECEIVE BUFFER DATA BYTE 6 ||||||||
|  |  | 15:8 | RECEIVE BUFFER DATA BYTE 5 ||||||||
|  |  | 7:0 | RECEIVE BUFFER DATA BYTE 4 ||||||||

*Figure 6*

METHOD FOR CAN CONCATENATING CAN DATA PAYLOADS

CROSS-REFERENCE TO RELATED APPLICATIONS

This application claims the benefit of U.S. Provisional Application No. 61/171,891 filed on Apr. 23, 2009, entitled "CAN MESSAGE DATA CONCATENATION BY STRIPPING CAN IDENTIFIER AND OTHER NON-DATA INFORMATION", which is incorporated herein in its entirety.

TECHNICAL FIELD

The present disclosure relates to controller-area network (CAN or CAN-bus) compatible microcontrollers, and, in particular to the storage of CAN messages.

BACKGROUND

Controller Area Network (CAN) is a serial communications protocol which efficiently supports distributed real-time control with a high level of security. Applications of CAN range from high speed digital communications networks to low cost multiplex wiring. CAN is a high-integrity serial data communications bus for real-time applications. CAN operates at data rates of up to 1 Megabits per second, has excellent error detection and confinement capabilities, and was originally developed for use in automobiles but is now also used in other areas as well. The interface between the CAN bus and the CPU is usually called the CAN controller. The motivation behind CAN was to make automobiles more reliable, safe and fuel-efficient by improving the interoperability of automotive electronics, engine control units, sensors, anti-skid brake systems, etc., while decreasing wiring harness weight and complexity. Since CAN's inception, the CAN protocol has gained widespread popularity in industrial automation and automotive/truck applications. The robustness of the CAN bus in noisy environments and the ability to detect and recover from fault conditions makes CAN suitable for use with, industrial control equipment, medical equipment, test equipment, mobile and portable machines, appliances, etc.

CAN is an asynchronous serial bus system with one logical bus line. It has an open, linear bus structure with equal bus nodes. A CAN bus consists of two or more nodes. The number of nodes on the bus may be changed dynamically without disturbing the communication of the other nodes.

The CAN logic bus corresponds to a "wired-AND" mechanism, "recessive" bits (mostly, but not necessarily equivalent to the logic level "1") are overwritten by "dominant" bits (mostly logic level "0"). As long as no bus node is sending a dominant bit, the bus line is in the recessive state, but a dominant bit from any bus node generates the dominant bus state. Therefore, for the CAN bus line, a medium is chosen that is able to transmit the two possible bit states (dominant and recessive). A common physical medium used is a twisted wire pair. The bus lines are then called "CANH" and "CANL," and may be connected directly to the CAN controller nodes or via a connector thereto.

In the CAN bus protocol it is not bus nodes that are addressed, but rather the address information is contained in the messages that are transmitted. This is done via an identifier (part of each message) which identifies the message content, e.g., engine speed, oil temperature, etc. The identifier additionally indicates the priority of the message. The lower the binary value of the identifier, the higher the priority of the message (more dominant bits).

The original CAN specifications (Versions 1.0, 1.2 and 2.0A) defined the message identifier as having a length of 11 bits, giving a possible 2048 message identifiers. An "extended CAN" specification Version 2.0B allows message identifier lengths of 11 and/or 29 bits to be used (an identifier length of 29 bits allows over 536 Million message identifiers). The CAN specifications (all versions) are incorporated by reference herein for all purposes.

Generally, two approaches may be used for CAN since an architecture for the CAN controller is not covered by the CAN standard, these two approaches are: "BasicCAN" and "FullCAN" (not to be confused with CAN 1 and CAN 2, or standard identifiers and extended identifiers); they differ in the buffering of messages.

The BasicCAN controller architecture is similar to simple UART, except that complete frames are sent instead of characters. Typically, there is a single transmit buffer and a double-buffered receive buffer. For example, a microcontroller puts a frame in the transmit buffer, and receives an interrupt when the frame is sent. When a frame is received in the receive buffer, the microcontroller receives an interrupt to empty the receive buffer and empties the frame from the receive buffer before a subsequent frame is received. In the BasicCAN controller architecture the microcontroller must manage the transmission and reception, and handle the storage of the frames.

The FullCAN controller architecture comprises a dedicated buffer and stores frames in this dedicated buffer. A limited number of frames may be dealt with depending on the size of the dedicated buffer. Each frame buffer is tagged with the identifier of the frame mapped to the buffer. The microcontroller can update a frame in the buffer and mark it for transmission. Receive buffers can be examined to see if a frame with a matching identifier has been received. In addition, filters may be used to pre-screen a received frame so that only those frames intended for use by the particular CAN controller is stored in a receive buffer.

Standard CAN vs Extended CAN

The CAN protocol usually comes in two versions: CAN 1.0 and CAN 2.0. CAN 2.0 is backwardly compatible with CAN 1.0, and most new controllers are built according to CAN 2.0. There are two parts to the CAN 2.0 standard: part A and part B. With CAN 1.0 and CAN 2.0A, identifiers must be 11-bits long. With CAN 2.0B identifiers can be 11-bits (a "standard" identifier) or 29-bits (an "extended" identifier). To comply with CAN 2.0 a controller must be either 2.0 part B passive, or 2.0 part B active. If it is passive, then it must ignore extended frames (CAN 1.0 controllers will generate error frames when they see frames with 29-bit identifiers). If it is active then it must allow extended frames to be received and transmitted. There are some compatibility rules for sending and receiving the two types of frames:

CAN 2.0B active controllers will send and accept both standard and extended frames. CAN 2.0B passive controllers will send and receive standard frames, and will discard extended frames without error.

CAN 1.0 controllers will generate errors when they see extended frames. Thus, a network where there is a single CAN 1.0 controller on the network cannot live with extended frames on the network; all the controllers must send using standard frames."

Controller Architectures

The architecture of controllers isn't covered by the CAN standard, so there is a variation in how they are used. There are, though, two general approaches: BasicCAN and Full- CAN (not to be confused with CAN 1.0 and 2.0, or standard identifiers and extended identifiers); they differ in the buffering of messages."

As stated above, in a BasicCAN controller the architecture is similar to a simple UART, except that complete frames are sent instead of characters: there is (typically) a single transmit buffer, and a double-buffered receive buffer. The CPU puts a frame in the transmit buffer, and takes an interrupt when the frame is sent; the CPU receives a frame in the receive buffer, takes an interrupt and empties the buffer (before a subsequent frame is received). The CPU must manage the transmission and reception, and handle the storage of the frames."

As stated above, in a FullCAN controller the frames are stored in a dedicated buffer of the controller. A limited number of frames can be dealt with (typically 16); because there can be many more frames on the network, each buffer is tagged with the identifier of the frame mapped to the buffer. The CPU can update a frame in the buffer and mark it for transmission; buffers can be examined to see if a frame with a matching identifier has been received."

The intention with the FullCAN design is to provide a set of "shared variables" in the network; the CPU periodically updates the variables (i.e. the contents of frames in the buffer); the CPU also can examine the variables. In practice, things are not so simple (of course) because of concurrency difficulties: while reading a set of bytes from a frame, the controller could overwrite the data with the contents of a new frame, and in many controllers this is signaled only by a status flag."

In "Basic CAN" implementations, there is generally one double buffered receive channel with one or more associated message acceptance filters. Having but one double buffered message channel means that the processor must be capable of handling the previous message within this time. In "Full CAN" implementations, there are generally up to 15 message buffers or channels, each with one associated message acceptance filter. Having a large number of receive-buffers can be helpful in dealing with bursts of message traffic if the processor is very slow, however, if the total message traffic is such that it overwhelms the processor capability, no amount of buffering can prevent the eventual loss of a message. Generally, the messages are transferred into a FIFO memory which can be read by a central processing unit (CPU). The CPU is then responsible to interpret the received data or to separate the control information from the data load. However, in many applications, at least for certain parts of a transmission, the attached control information is of little concern and the data load is spread over a plurality of messages which must be re-assembled from the FIFO memory. This can cause unwanted CPU overhead. There is, therefore, a need in the art for a CAN implementation that can handle certain data transmissions more convenient for a user.

SUMMARY

According to an embodiment, a controller area network (CAN) controller unit may comprise a message assembly buffer receiving a serial bitstream; a buffer memory coupled in parallel with the message assembly buffer; a CAN control unit coupled with the message assembly and the buffer memory; and at least one control register wherein the at least one control register is operable to be programmed to cause the CAN control unit to store a message received in the message assembly register in at least a first and second mode, wherein in the first mode, control information and data payload of the received CAN message are stored in the buffer memory and in the second mode only the data payload of the CAN message is stored in the buffer memory.

According to a further embodiment, the control register may comprise a first bit indicating that the second mode is set. According to a further embodiment, the control register can be programmed to cause the CAN control unit to further store time stamp information along with the control information. According to a further embodiment, the control register may comprise a second bit indicating to store the time stamp information. According to a further embodiment, the control register may comprise a third bit indicating when the time stamp information is generated. According to a further embodiment, when in the second mode the device may ignore a setting which initiates the storing of time stamp information. According to a further embodiment, the buffer memory can be a FIFO memory. According to a further embodiment, the FIFO memory may comprise a plurality of configurable FIFO buffers. According to a further embodiment, the buffer memory may comprise a plurality of configurable buffers. According to a further embodiment, the unit may further comprise control registers for each configurable buffer comprising at least one bit for determining an operating mode of a respective buffer. According to a further embodiment, the unit may further comprise logic coupling a plurality of mask register and a plurality of filter registers with the CAN control unit, wherein the logic generates a signal indicating a valid entry in the message assembly buffer shift register.

According to another embodiment, a method of storing a Controller Area Network (CAN) message may comprise the steps of: —receiving a CAN message; —assembling the CAN message; and—determining a storage mode, wherein in a first mode, control information and data payload of the received CAN message are stored in a buffer memory and in the second mode only the data payload of the CAN message is stored in the buffer memory.

According to a further embodiment of the method, the CAN message can be a standard CAN message as well as an extended CAN message. According to a further embodiment of the method, the second mode can be programmed by setting a first bit in a control register. According to a further embodiment of the method, a plurality of buffer memories can be provided and an operating mode of each buffer memory can be programmed in associated control registers. According to a further embodiment of the method, a third mode may be provided in which time stamp information is stored along with the control information and data payload. According to a further embodiment of the method, time stamp information can be generated programmably. According to a further embodiment of the method, the third mode can be programmed by setting a second bit in a control register. According to a further embodiment of the method, when in the second mode a setting which initiates the storing of time stamp information may be ignored. According to a further embodiment of the method, the buffer memory can be a FIFO memory. According to a further embodiment of the method, the FIFO memory may comprise a plurality of configurable FIFO buffers and further comprising the step of configuring the FIFO buffers. According to a further embodiment of the method, the step of assembling a CAN message can be performed by a message assembly buffer shift register. According to a further embodiment of the method, the method may further comprise the step of generating a validity signal by means of a plurality of mask register and a plurality of filter registers indicating a valid entry in the message assembly buffer shift register.

According to yet another embodiment, a microcontroller may comprise a central processing unit (CPU); a Controller Area Network (CAN) controller comprising: a message assembly buffer receiving a serial bitstream; a FIFO memory coupled in parallel with the message assembly buffer and with the CPU; a CAN control unit coupled with the message assembly and the FIFO memory; and a control register wherein the control register is operable to be programmed by the CPU by setting a bit to cause the CAN control unit to store a message received in the message assembly register in at least a first and second mode, wherein in the first mode, control information and data payload of the received CAN message are stored in the FIFO memory and in the second mode only the data payload of the CAN message is stored in the FIFO memory.

According to a further embodiment of the microcontroller, the microcontroller may further comprise a time capture unit, wherein the control register comprises a second bit which can be programmed to cause the CAN control unit to further store time stamp information from the time capture unit along with the control information.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 4 shows a the organization of a FIFO in a first operating mode.

FIG. 5 shows a the organization of a FIFO in a second operating mode;

FIG. 6 shows a the organization of a FIFO in a third operating mode

DETAILED DESCRIPTION

Figure 10:
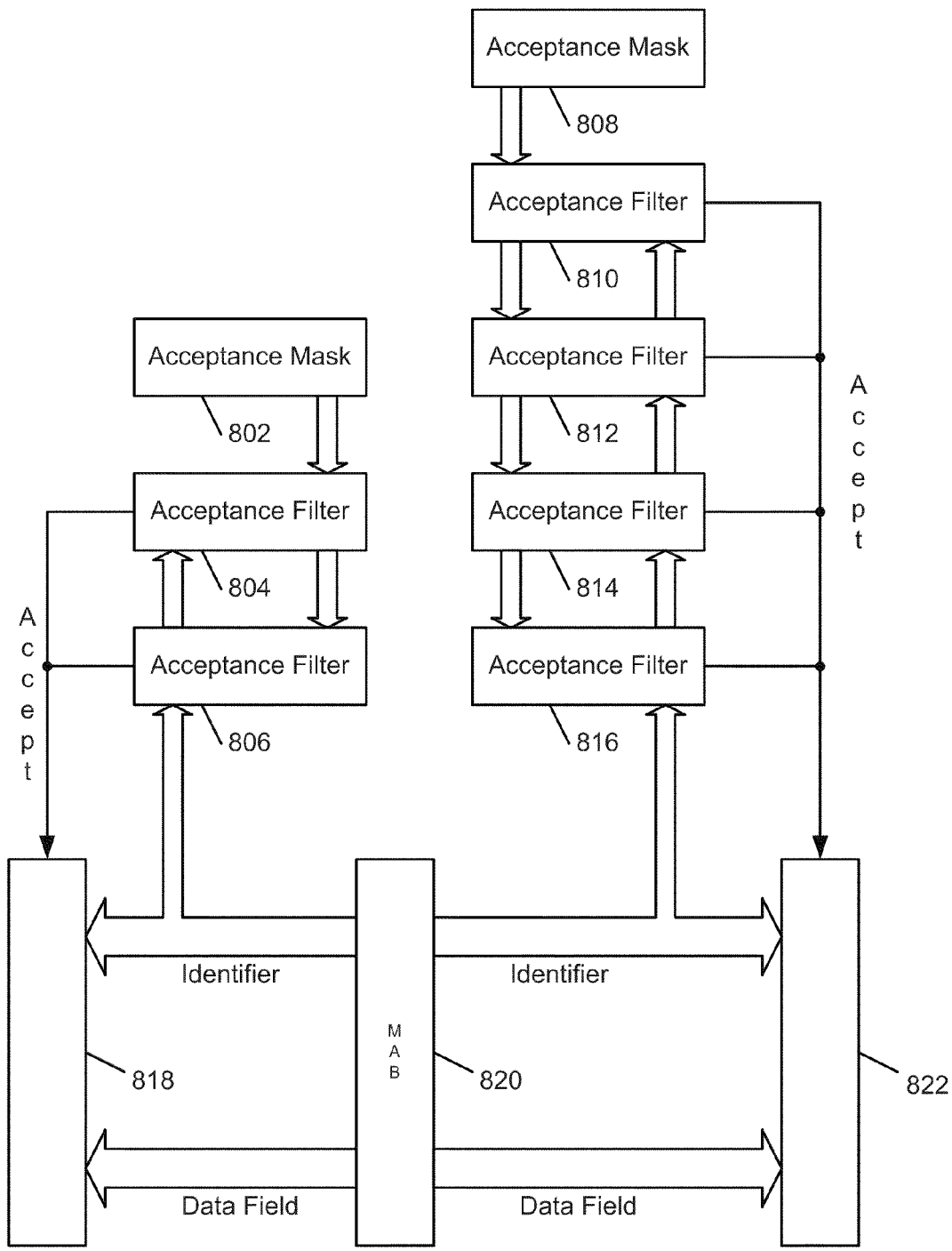
FIG. 10 shows a conventional CAN controller module.

Referring to FIG. 10, receive buffers 818, 820, and 822 and associated mask 802, 808 and filter registers 804, 806, 810, 812, 814, 816 of a conventional CAN controller for use in a microcontroller are illustrated. Buffer 820, designated as a message assembly buffer (MAB), functions only to monitor the CAN logic bus (not shown) for incoming messages. The MAB 820 holds a de-stuffed bit stream from the bus line. The bit stream consists of a message, i.e. a data frame, remote frame, or other frame, comprising an identifier and data field (not shown). The CAN controller comprises two dedicated buffers 818 and 822 which can be accessed by the CPU of a microcontroller. The MAB 820 allows these receive buffers 818 and 822 parallel access to the message. MAB 820 also allows acceptance filters 806 and 816 access to the identifier portion of the message. Parallel transfer of the bit stream message to receive buffers 818 or 822 may not be allowed until acceptance masks 802 and 808 and acceptance filters 804, 806, 810, 812, 814, and 816 apply an acceptance match test to the message.

Programmable acceptance filter masks 802 and 808, respectively, are used to select which bits of the unstuffed bit-stream message should be compared with the contents of acceptance filters 804 and 806, and 810, 812, 814, and 816.

The acceptance match test proceeds as follows: Filters 804, 806, 810, 812, 814, and 816 receive the identifier field of the message and compare that field to filter values. If there is a match between the identifier field and a filter value, then the message is loaded into the matching filter's corresponding receive buffer 818 or 822. Filters 804 and 806 are connected to buffer 818, filters 810, 812, 814, and 816 to buffer 822.

There is an implied priority to the receive buffers. Buffer 818 is the higher priority buffer and has message acceptance filters 804 and 806 associated with it. Buffer 822 is the lower priority buffer and has acceptance filters 810, 812, 814, and 816 associated with it. That fewer filters are associated with buffer 818 than with buffer 822 means that buffer 818 is more restrictive than buffer 822. The more restrictive buffer 818 has, by implication, the higher criticality associated with it.

On the occasion when two "high-priority" messages are received by MAB 820 in quick succession, receive buffer 818, designated as the first high-priority buffer, will receive the first high-priority message. Upon receipt of the second high-priority message, MAB 820 finds that buffer 818 is currently occupied by a high-priority message. MAB 820 then directs buffer 822, designated as the second high-priority buffer, to receive the second high-priority message. Buffers 818 and 822 are ranked, respectively, as the first high-priority buffer and the second high-priority buffer in this scenario.

The central processing unit (CPU) (not shown in FIG. 10) may operate on one of the receive buffers 818 and 822, while the other is available for reception or holding a previously received message.

The protocol in the case of the arrival of two high-priority messages is effected by the BUKT bit in the control registers (not shown) of receive buffers 818 and 822. Table I depicts and explains the control register of receive buffer 818, wherein R/W means Readable/Writable bit, and wherein R means Read-only bit.

TABLE I

| bit7 | bit6 | bit5 | bit4 | bit3 | bit2 | bit1 | bit0 |
|------|------|------|------|------|------|------|------|
| R/W  | R/W  | R/W  | R/W  | R/W  | R/W  | R    | R/W  | bit7: Message Ready Status
1 = Receive Buffer contains a valid received message
0 = Receive Buffer open to receive new message
Bit is only set by CAN module, bit is only cleared by CPU.
bit6-5: Receive Buffer Operating Mode
11 = receive all messages including those with errors
10 = receive only valid messages with extended identifiers
01 = receive only valid messages with standard identifiers
00 = receive all valid messages
bit4: Message Reception Interrupt Enable
1 = Interrupt Enabled
0 = Interrupt Disabled
bit3: Received Remote Transfer Request
1 = Remote Transfer Request Received
0 = No Remote Transfer Request Received
bit2: (BUKT) Enable Overflow to Receive Buffer 122
1 = Receive Buffer 118 Overflow Will Write to Buffer 122
0 = No Overflow to Buffer 122 Allowed
bit1: Read Only Copy of bit2 (BUKT)
bit0: Indicates which acceptance filter enabled the message reception
1 = acceptance filter associated with Buffer 122
0 = acceptance filter associated with Buffer 118
If set to "1," the BUKT bit implements a priority-based protocol. Table II depicts and explains the control register of receive buffer 822.

TABLE II

| bit7 | bit6 | bit5 | bit4 | bit3 | bit2 | bit1 | bit0 |
|------|------|------|------|------|------|------|------|
| R/W  | R/W  | R/W  | R/W  | R/W  | R/W  | R/W  | R/W  | bit7: Message Ready Status
1 = Receive Buffer contains a valid received message
0 = Receive Buffer open to receive new message
Bit is only set by CAN module, bit is only cleared by CPU.
bit6-5: Receive Buffer Operating Mode [these bits are optional]
11 = receive all messages including those with errors
10 = receive only valid messages with extended identifiers
01 = receive only valid messages with standard identifiers
00 = receive all valid messages
bit4: Message Reception Interrupt Enable
1 = Interrupt Enabled
0 = Interrupt Disabled
bit3: Received Remote Transfer Request
1 = Remote Transfer Request Received
0 = No Remote Transfer Request Received
bit2-0: Indicates which acceptance filter enabled the message reception
101 = acceptance filter 116
100 = acceptance filter 114
011 = acceptance filter 112
010 = acceptance filter 110
001 = acceptance filter 106 [only if BUKT bit set to "1" in control register for buffer 118]
000 = acceptance filter 104 [only if BUKT bit set to "1" in control register for buffer 118]

Figure 1:
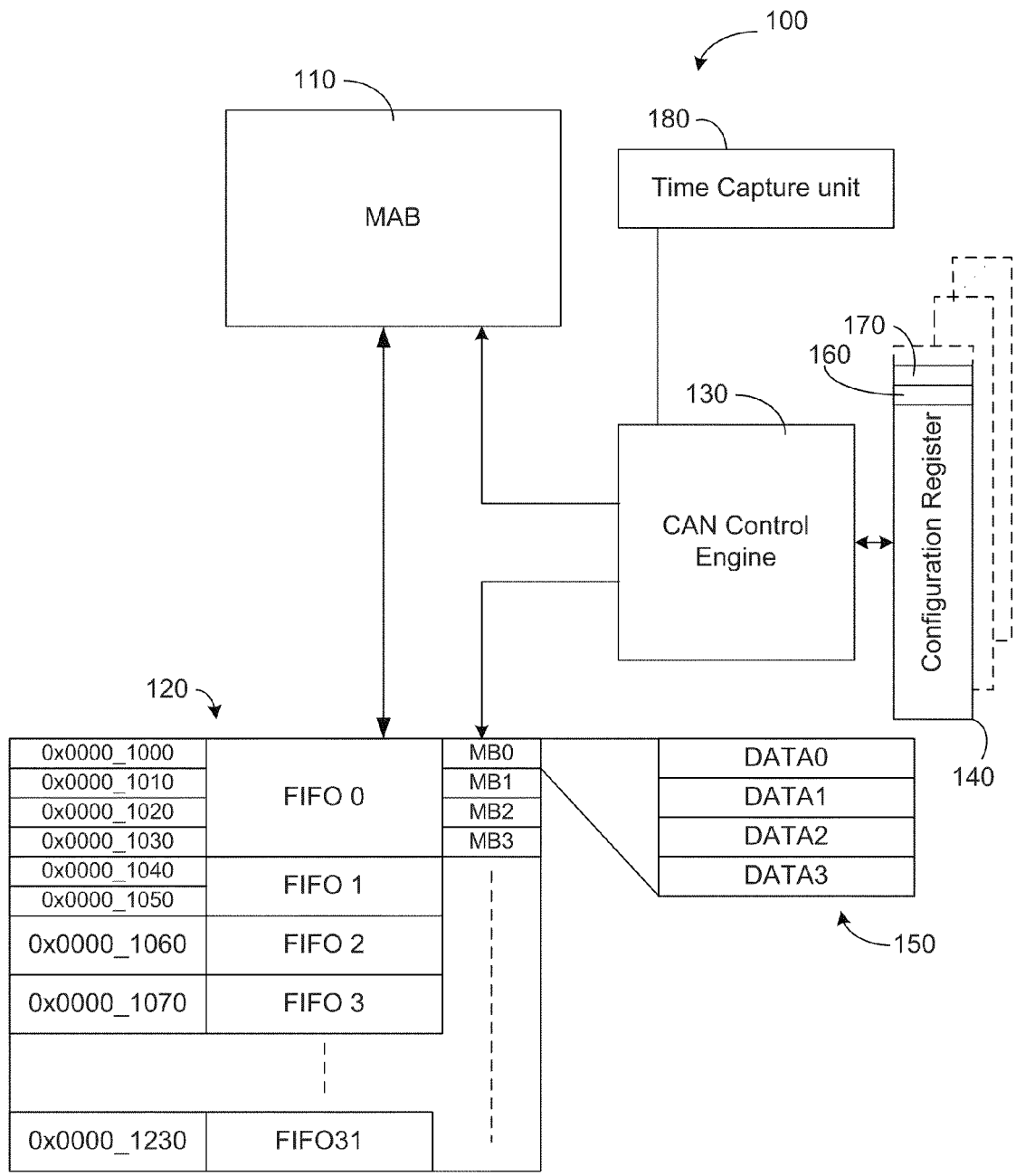
FIG. 1 shows a block diagram of parts of a CAN module/controller according to an embodiment.

FIG. 1 shows the modification of a conventional CAN controller according to an embodiment. Here, only the most relevant parts of a CAN controller are shown. The message assembly buffer (MAB) block 110 is coupled with a buffer memory 120. Memory 120 can be configured as a FIFO memory and may be an independent memory device. However, according to other embodiments, memory 120 may also be formed by a main memory of a microprocessor system or microcontroller. Thus, a microcontroller may use its general purpose memory, for example its data memory, and assign a memory space designated to form buffer memory 120. Additional circuitry may be added to add the functionality of a FIFO memory to buffer memory 120, in particular, if buffer memory 120 is formed by a standard memory device.

A CAN control engine 130 is provided to control transfer of a received buffer entry into the memory 120. At least one control register 140 is coupled with CAN control engine 130 and programmable to select a variety of different operating modes. Buffer memory or FIFO memory 120 can be divided into a plurality of buffers or FIFOs 0 ... 31 as shown. Each buffer/FIFO 0 ... 31 can have multiple message entries wherein the buffer/FIFOs are programmable in size and operating characteristics. For example, FIFO0 has four Message Buffer (MB0 to MB3) entries, FIFO 1 has two buffer entries, etc. FIG. 1 also shows exemplary associated start addresses for each FIFO 0 ... 32. According to one embodiment, a buffer entry 150 assigned to store a message from the MAB 110 may consist of four 32-bit double words. According to various embodiments, configuration register 140 may have a first bit 160 and optionally also a second bit 170 that indicates the mode in which data from the MAB 110 is stored in the buffer memory 120. For example, the first bit 160 can indicate that only the data load of CAN message is transferred into the FIFO 120. Thus, when set, all further control information is disposed off and only the data load is transferred into FIFO memory 120. According to another embodiment, the second bit 170 can be used to add additional time stamp information from a time capture unit 180 to the received message. Multiple second bits 170 may be implemented according to further embodiments as indicated by the dotted additional bit in register 140, to specify whether to capture the time at the first bit of the message (start bit) or the end of the message (stop bit). Thus, the actual event that causes the time stamp may be selectable. Other configurations with more designated mode bits are possible.

Typically there can be a configuration register for each FIFO in the device as indicated by the dotted lines. Having a separate bit for each FIFO in FIG. 1 will allows an application to treat one FIFO as a data accumulation FIFO (with bit 160 set) and a separate FIFO to be a generic FIFO for requiring further processing by a CPU (with bit 160 clear).

FIG. 1 shows a scenario with FIFO0 configured with bit 160 is clear. In such an embodiment, each message buffer (MB0 to MB3) comprises 4, 32-bit words with data laid out as shown in FIG. 4 (with 170 clear) or FIG. 5 (with 170 set). According to another example, if FIFO0 is configured with bit 160 set, buffer entry 150 in FIG. 1 would only have two 32-bit words (DATA0 and DATA1), corresponding to a data from the CAN protocol as shown in FIG. 6. Thus, according to an embodiment, when bit 160 is set, CAN control engine 130 controls the transfer of CAN messages such that only the data payload of the CAN message is transferred into the FIFO 120. This can be done such, that a continuous data stream is formed within FIFO 120 without any intermittent control information.

The module contains a number of FIFO buffers FIFO0 ... 31 used to store CAN messages. The FIFOs are fully configurable, with CAN messages stored outside the module, anywhere in system memory. Each FIFO may be configurable as a transmit or receive FIFO, have an independent size, a user read-able head/tail pointer, independently configurable interrupts, other status bits to give the status of messages as they are transmitted or received.

According to an embodiment, the following steps can be performed to configure the CAN Module FIFOs: Place the module into configuration mode (OPMOD=100); Allocate an area of memory (typically block of SRAM) in which to locate the FIFO; update a respective register with the physical start (base) address of the FIFO; update the FIFO control register with the FIFO size (CFIFOCON.FSIZE); select whether the FIFO is to be a transmit or receive FIFO CFIFOCON.TXEN); set any of the control bits, for example bits 160 or 170, in control register 140; and place the module into normal mode (OPMOD=000).

Once a FIFO buffer of FIFO memory 120 has been configured as a transmit FIFO, the user is able to use the FIFO buffer to transmit data. The user can read the FIFO tail pointer (CFIFOUA) which gives next location in FIFO to place the message to be transmitted. This address will have to be translated into a virtual address by the CPU. The CAN message should be loaded, starting at the location given by CFIFOUA. Once the FIFO buffer has been loaded with the message to be transmitted the user increments the FIFO head pointer by setting the CFIFOCON.UINC bit. This will increment the head pointer and increase address pointed to by CFIFOUA by four 32-bit words or 16 bytes. The message is then ready to be transmitted.

Once a FIFO buffer of FIFO memory 120 has been configured as a receive FIFO with the respective transfer mode set by control bits 160, 170 or any other control bits, the user will be able to read messages as they are received by the FIFO. After a message is received, the user will read the physical address of the start of the message from CFIFOUA. The message can then be read from this address. After reading the message from the FIFO the user may update the tail pointer by setting a CFIFOCON.UINC bit. This will increment the tail pointer and increase the address pointed to by CFIFOUA by 4 or 2, depending on the value of bit 160 in control register 140. However, such an increment may be performed automatically as will be explained in more detail below with respect to FIG. 2.

The CAN module continually monitors messages on the CAN bus. As messages are received by the CAN module the message identifier may be compared to filter/mask combinations that are presently configured as will be explained in more detail below in combination with another embodiment. If a match occurs the module will store the message in the FIFO pointed to by a pointer register.

Figure 3:
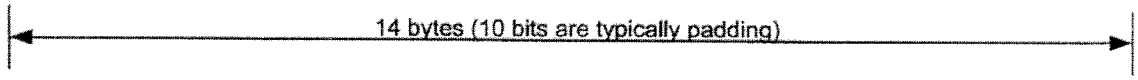
FIG. 3 shows the differences between a standard CAN message and an extended CAN message.

FIG. 3 shows the structure of standard CAN massages and extended messages. The two types differ in the size of the control data added to the message. In particular, the extended message allows for significantly longer identification bits whereas the size of the actual data carried in both message is always 8 bytes. These messages are intermittently stored in the message assembly buffer 110 and then transferred into a respective FIFO of memory 120 under control of CAN Control engine 130. Depending on the design and organization of the buffer memory 120, different ways of storing those message apply. For example, in a 32-bit system, each buffer entry MB0, MB1, MB2, MB3 may have four 32-bit words DATA0, DATA1, DATA2, and DATA3. In a first operating mode, a received standard or extended message may be stored within these four 32-bit words, wherein the first two words DATA0 and DATA1 may contain the identifier (SID, EID) and control bits, for example, indicating the length of the actual data (DLC) contained in the message, whereas the actual data are always stored in the third and fourth word DATA2 and DATA3. An example of this is shown in FIG. 4. A second mode can be similar to the first mode and may be triggered by setting a respective bit 170, for example in control register 140. If this bit is set, additional information which may be obtained from a time capture unit 180 which is selectively triggered by the receipt of a message (or start of a message), can be stored in the first two data words DAT0 and DAT1. Thus, a time stamp information captured from a respective timer in time capture unit 180 may be added to the message. An example of this is shown in FIG. 5.

According to various embodiments, a special receive mode exists where only the data is stored, and the identifier, reserved bits and other control information are not stored with the message. The user enables this mode by setting bit 160 in the control register 140. In this mode 8 bytes of data are stored, regardless of the control information. Thus, according to a specific embodiment, the data length information (DLC) is ignored and unused bytes can be filled with 00h. One possible use of this mode is to concatenate messages whose data spans multiple messages, for example transmitting a string across the CAN bus. According to one embodiment, no timestamp is stored with the data, even if the respective bit 170 as explained above is set.

If for example a string "Hello World" is send from a node 1 to a node 2, two messages are necessary because the string is longer than 8 bytes. In the first two operating modes the messages would be stored as follows:

SID
EID
DLC = 8
D0 = 'H'
D1 = 'e'
D2 = 'l'
D3 = 'l'
D4 = 'o'
D5 = ' '

-continued

D6 = 'W'
D7 = 'o'
SID
EID
DLC = 4
D0 = 'r'
D1 = 'l'
D2 = 'd'
D3 = 0x00

Whereas in the third mode with bit 160 set, the message would be stored as follows:

D0 = 'H'
D1 = 'e'
D2 = 'l'
D3 = 'l'
D4 = 'o'
D5 = ' '
D6 = 'W'
D7 = 'o'
D0 = 'r'
D1 = 'l'
D2 = 'd'
D3 = 0x00

Thus, in the third mode, the memory 120 is filled sequentially with only the data of each CAN message. The third mode, therefore, will remove significant software overhead when parsing through CAN messages received. This will also allow easier concatenation of messages spread over multiple messages and save hardware required to save messages because normally four 32-bit words are required to store address & data payload whereas the third mode would only require two 32-bit words to store the data payload.

Figure 2:
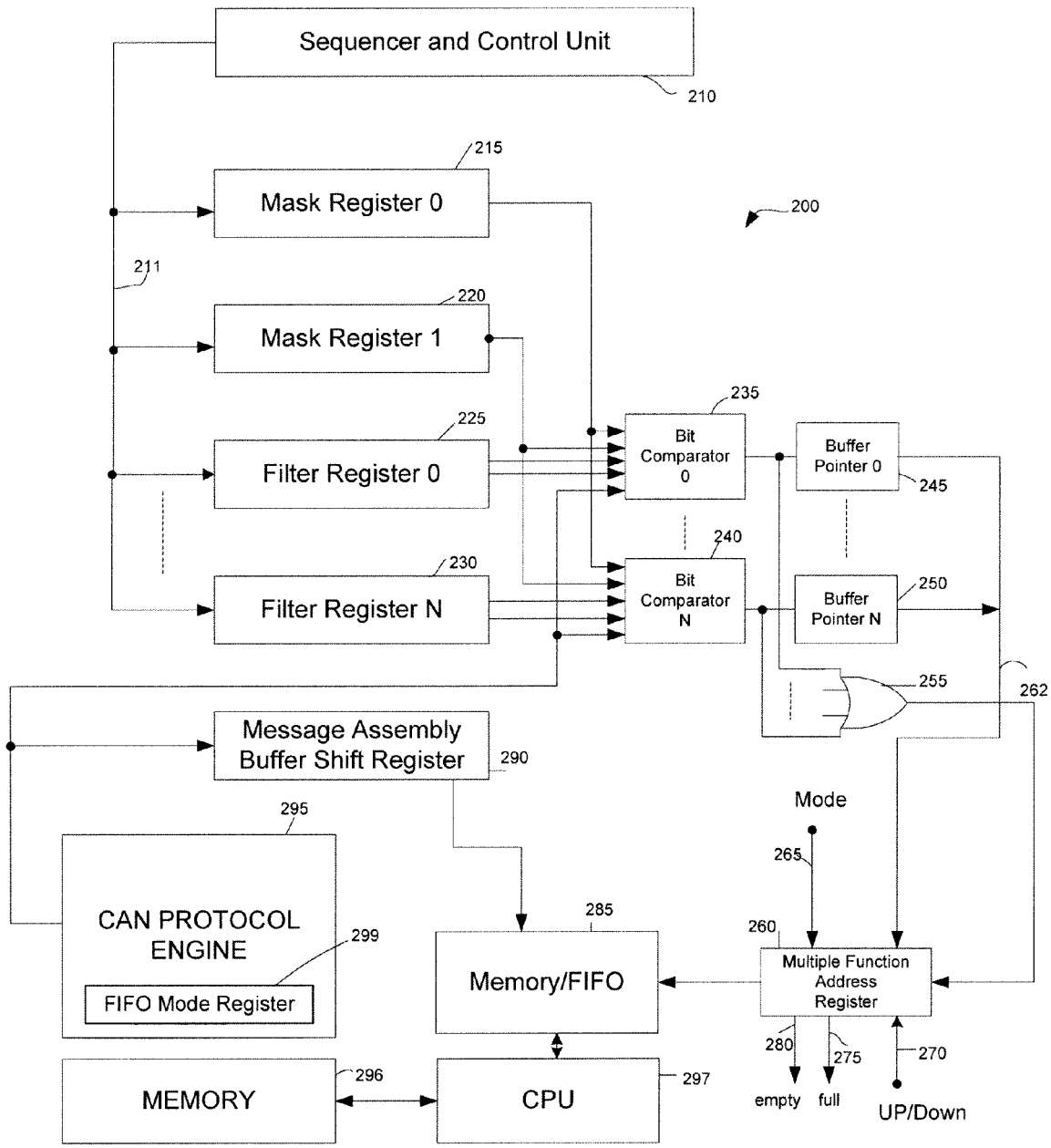
FIG. 2 shows a block diagram of parts of a microcontroller with a CAN module/controller according to another embodiment.

FIG. 2 shows a more detailed block diagram of an exemplary embodiment. A first and second mask register 215 and 220 are bit-wise addressable and comprise a single output bit. Furthermore, a plurality of filter registers 0 . . . N (only two are shown) are designated by numerals 225 and 230. The filter registers 225, 230 also comprise a single output bit and are bit-wise addressable. In addition mask registers 215 and 220 as well as all filter registers 225, 230 are read and write-able in a parallel mode by a central processing unit 297 (connection not shown in FIG. 2). A sequencer and control unit 210 operates as a bit select unit and generates address signals which are fed to mask register 215 and 220 and all filter registers 225, 230. Each filter register 225, 230 comprises an associated bit comparator unit 235, 240. The bit output signal of mask register 215 and 220 are fed to first and second inputs of bit comparator units 235, 240. Furthermore, each bit output of the filter registers 225, 230 is fed to a third input of their associated bit comparator unit 235, 240. A bit stream signal from a CAN bus is provided by a CAN protocol engine 295 and fed to a fourth input of each bit comparator unit 235, 240. Filter registers 225, 230 can provided additional storage bits which are coupled with a fifth input of each associated bit comparator unit. The output of each bit comparator unit 235, 240 carries the acceptance signal and is coupled with a control input of an associated buffer pointer 245, 250. An OR gate 255 is provided having as many inputs as the number of filter registers. Each input receives an acceptance signal from a respective bit comparator unit 235, 240. The outputs of each buffer pointer 245 and 250 are coupled with a buffer pointer bus 262 which is connected to an address input of a multiple function address register 260. The output of OR gate 255 is coupled with a control input of multiple function register 260. Multiple function register 260 further comprises a mode control input 265, a first status output 275 indicating whether a buffer memory 285 is full, a second status output 280 indicating whether the buffer memory 285 is empty, and an up/down control input for a counter function of the multiple function address register 260. An address output 264 of multiple function address register 260 is coupled with the address input of buffer memory 285. Buffer memory 285 is fully configurable as a FIFO and may have a plurality of FIFO buffers which can be variable in size. Buffer memory 285 may be configured as a dual port memory whose first port is coupled with a message assembly buffer shift register 290 receiving the serial data stream from the CAN protocol engine 295. CAN protocol engine 295 may have one or more configuration registers. FIG. 2 shows FIFO mode register 299 which controls the operating mode indicating in which way data are transferred from the message assembly buffer shift register 290 into the respective FIFO buffer of buffer memory 285. The second port of buffer memory 285 may be coupled with central processing unit 297 which is furthermore coupled with a memory 296 for storing program and data information.

This embodiment again provides for the same modes to write data from a serial data stream into the buffer memory 285 as explained above. The comparison of filter values stored in filter registers 225, 230 and transmitted identifiers may be achieved in a bit-wise fashion rather than in parallel. Thus, parallel comparators, which need a relatively big amount of silicon real estate, can be avoided. A serial data stream provided by CAN protocol engine 295 comprises an identifier which is fed directly to all bit comparator units 235, 240. Sequencer and control unit 210 address the mask registers 215, 220 and all filter registers 225, 230 to output a corresponding bit to the bit comparator units 235, 240. The bit comparator units 235, 240 compare all filter register bits with the respective identifier bit within a frame. The result is further processed by comparing it to the respective mask register bit. To this end, the additional storage bits of each filter register 225, 230 can indicate which mask register should be used for this comparison. This function will be explained in more detail below. The final comparison result will be accumulated for all bits of each identifier within a frame. If a single comparison fails the acceptance signal will not be generated. If every bit comparison is positive the acceptance signal will be fed to the respective buffer pointer 245, 250 and to a respective input of OR gate 255.

A central processing unit 297 can control the multiple function address register 260 in the following manner. According to an embodiment, two function modes can be selected through mode signal 265. In the first function mode the buffer pointer 245, 250 contain the address in buffer memory 285 to directly write data into the buffer memory 285 at specified locations. Multiple function address register 260 latches an address which has been put on address bus 262 and addresses buffer memory 285 which stores data in parallel that has been assembled by message assembly buffer shift register 290 wherein CAN protocol engine 295 controls which data from message assembly buffer shift register 290 are transferred into the buffer memory 285.

A second function mode can be selected by means of control signal 265. In this mode the buffer pointers 245, 250 are not needed and therefore their output signals will be neglected. When this mode is activated the actual address register within multiple function address register is, for example, set to "Fh" and the status signal 280 will signal an empty buffer. Every time a bit comparator unit 235, 240 generates an acceptance signal this triggers an increment function of the multiple function address register 260 and its content will therefore be incremented by 1. Thus, the first data assembled by message assembly buffer shift register 290 will be stored at memory location 0 under control of CAN protocol engine 295. This function provides a pure FIFO functionality of the CAN module in which no buffer is associated with any bit comparator. The FIFO memory 285 will be sequentially written until the address reaches "Fh" again which indicates that the buffer is full unless the CPU has read previous entries. A full FIFO memory 285 will be indicated by control signal 275. In an additional mode control signal 270 can select between a incrementing and decrementing function of the address register. Additional signals can be provided by the CPU 297 to indicate whether a buffer value has been read for generating the proper status signals 275, and 280 and to ensure that no value will be overwritten before it has been fetched by the CPU 297. Other function modes of the buffer memory 285 may be implemented.

FIFO mode control register 299 may have a plurality of bits each indicating a specific operating mode of the FIFO 285 as explained above with respect to FIG. 1. FIGS. 4-7 show the previously explained three possible operating modes in more detail. In FIG. 4, shows the normal mode in which a standard or extended CAN message is stored. The first 32-word uses 11 bits to store the identifier SID. 27 bits of the second 32-bit word are used to store various control bits DRR, IDE, the extended identifier EID, bits RTR, RB1, RB0, and data length information DLC. The third and fourth 32-bit words store the data bytes 0-7. FIG. 5 shows the time stamp mode in which time stamp information CMSGTS is stored in the upper 16 bits of the first 32-bit word and filter information in the following 5 previously unused bits of the first 32-bit word. The other three 32-bit data words are used identical to the first operating mode.

FIG. 6 shows the way a message is stored when the respective bit in FIFO mode register 299 is set. Now, only the data payload is stored occupying the first and second 32-bit word. The third and fourth 32-bit word is then used to store data of a consecutive message.

Figure 7:
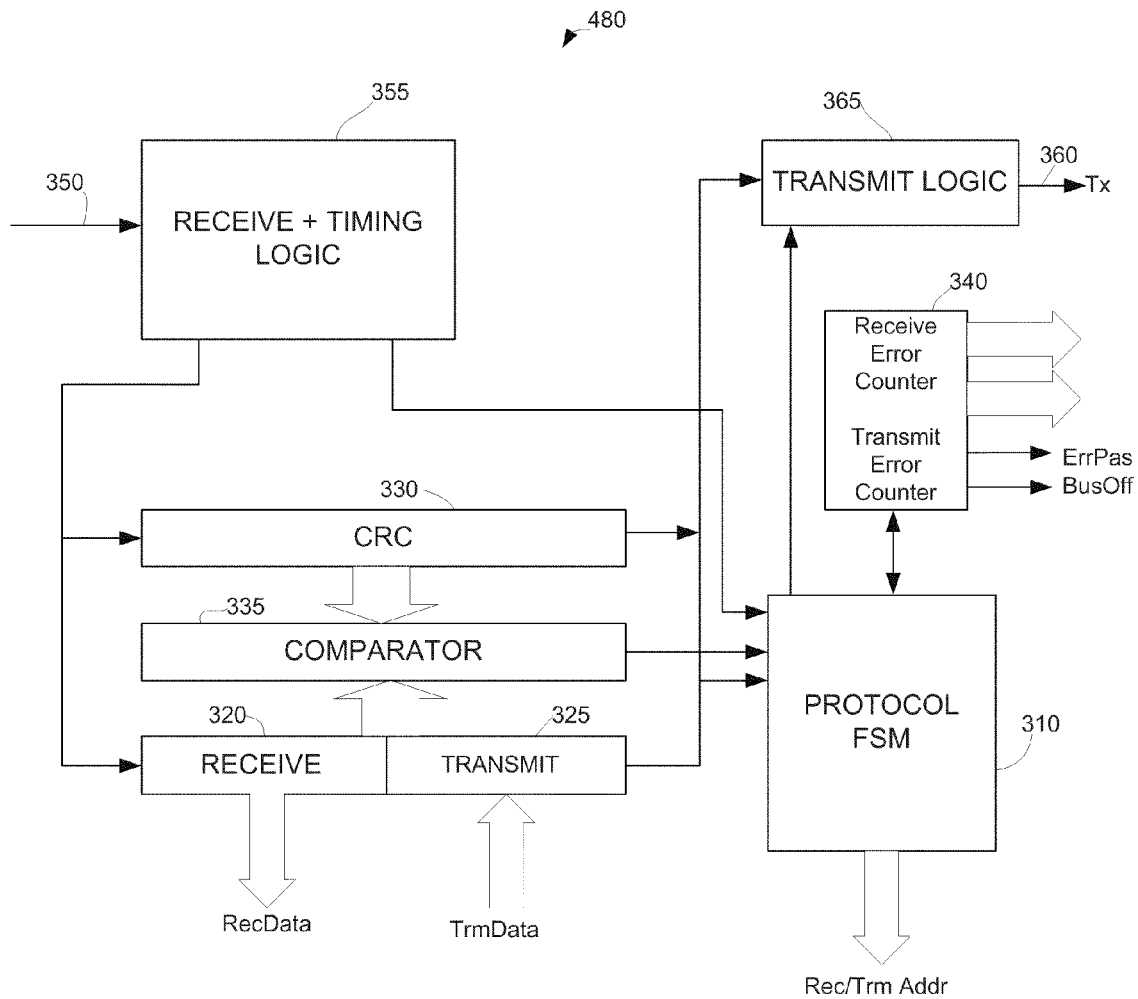
FIG. 7 shows an embodiment CAN protocol engine from FIG. 1.

FIG. 7 shows the CAN protocol engine 480 from FIG. 1 in more detail. The protocol engine 480 combines several functional blocks. The heart of the engine 480 is the protocol finite state machine 310 (FSM). This state machine sequences through the messages on a bit by bit basis, changing states of the machine as various fields of various frame types are transmitted or received. The FSM 310 is a sequencer controlling the sequential data stream between the RX/TX shift register 320, 325, the CRC Register 330, and the receive bus line 350 and transmit bus line 360, respectively. The shift registers 320, 325 can be part of the message assembly register 490. Additional components 355 and 365 are provided to convert the data streams and adapt to the respective timing on the bus lines 350 and 360. The FSM also controls the Error Management Logic 340 (EML) and the parallel data stream RecData between the TX/RX shift register 320, 325 and other components of the CAN module. The processes of reception arbitration, transmission, and error signaling are performed according to the CAN protocol. The FSM 310 also handles any automatic transmission of messages on the bus line.

The data interface to the protocol engine 480 consists of byte wide transmit and receive data. Rather than assembling and shifting an entire frame, the frames are broken into bytes. A receive or transmit address from the protocol FSM 310 signifies which byte of the frame is current. For transmission, the appropriate byte from the transmit buffer is selected and presented to the engine, which then uses an 8-bit shift register to serialize the data. For reception, an 8-bit shift register assembles a byte which is then loaded within the appropriate byte in the message assembly buffer 490.

The cyclic redundancy check register 330 generates the Cyclic Redundancy Check (CRC) code to be transmitted over the data bytes and checks the CRC code of incoming messages. The Error Management Logic (EML) 340 is responsible for the fault confinement of the CAN device. Its counters, the Receive Error Counter and the Transmit Error Counter, are incremented and decremented by commands from the Bit stream processor. According to the values of the error counters, the CAN controller is set into states error active, error passive or bus off.

The Bit Timing Logic (BTL) within unit 355 monitors the bus line input and handles the bus line related bit timing according to the CAN protocol. The BTL synchronizes on a recessive to dominant bus line transition at Start of Frame and on any further recessive to dominant bus line transition, if the CAN controller itself does not transmit a dominant bit. The BTL also provides programmable time segments to compensate for the propagation delay time and for phase shifts and in defining the position of the Sample Point in the bit time. The programming of the BTL depends on the baud rate and on external physical delay times.

Figure 8:
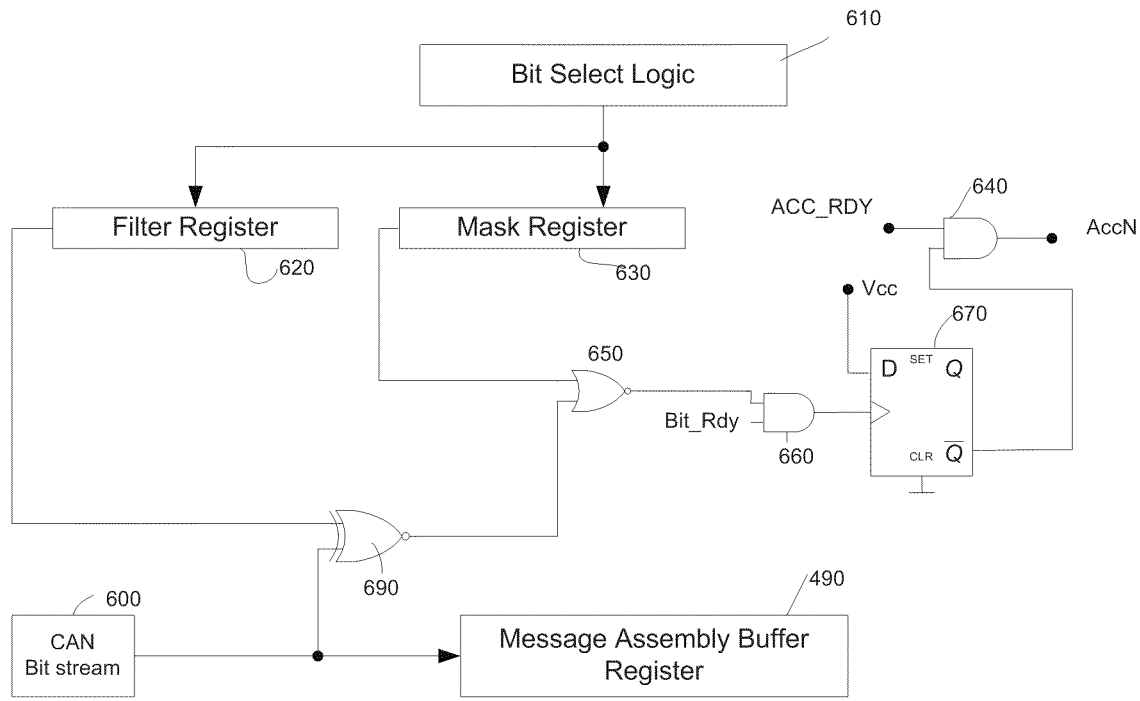
FIG. 8 shows an exemplary embodiment of a comparator unit.

In FIG. 8 an exemplary embodiment of a comparator unit shown. The details are shown for a single Bit comparator unit but apply for all other bit comparator units accordingly. Numeral 600 indicates a unit providing a CAN serial data stream which is fed to a message assembly buffer register 490 and the first input of an Exclusive NOR gate 690. The single bit output of a filter register 620 is coupled with the second input of Exclusive NOR gate 690 whose output is connected with the first input of a NOR gate 650. The second input of NOR gate 650 receives the single bit output signal from mask register 630. The output of NOR gate 650 is coupled with the first input of an AND gate 660 whose output is coupled with the control input of a D-Flip-Flop 670. Input D of D-Flip-Flop 670 is coupled with a logical "low" signal such as Vcc. The inverting output of D-Flip-Flop 670 is coupled with the first input of AND gate 640 whose output provides the acceptance signal. AND gates 640 and 660 comprises second inputs ACC_RDY and BIT_RDY, respectively which are used for synchronization with the respective input signals. A Bit Select Logic 610 is coupled with filter register 620 and mask register 630 to select the respective bits which will be used for comparison within each frame.

The incoming CAN bit stream is synchronized with the bit select logic 610. In other words, bit select logic 610 selects the respective bit in filter register 620 and mask register 630 that corresponds to the incoming bit of the serial bit stream. The actual comparator is formed by Exclusive NOR gate 690 which only generates a logic "high" at its output if both input signals are identical. NOR gate 650 is used as a mask unit to mask out a result if a respective bit within the mask register 630 is set. D-Flip-Flop 670 is used as a register to accumulate the results within a chain of comparisons and is preset to "1" at the start of a frame. Only if all comparisons within a frame are successful, then the acceptance signal AccN at the output of AND gate 640 will be generated. Otherwise the D-Flip-Flop 670 is set to "0" by a false comparison result and stays "0" until the end of the frame. The two control signals ACC_RDY and BIT_RDY are used to synchronize and activate the respective signals.

Figure 9:
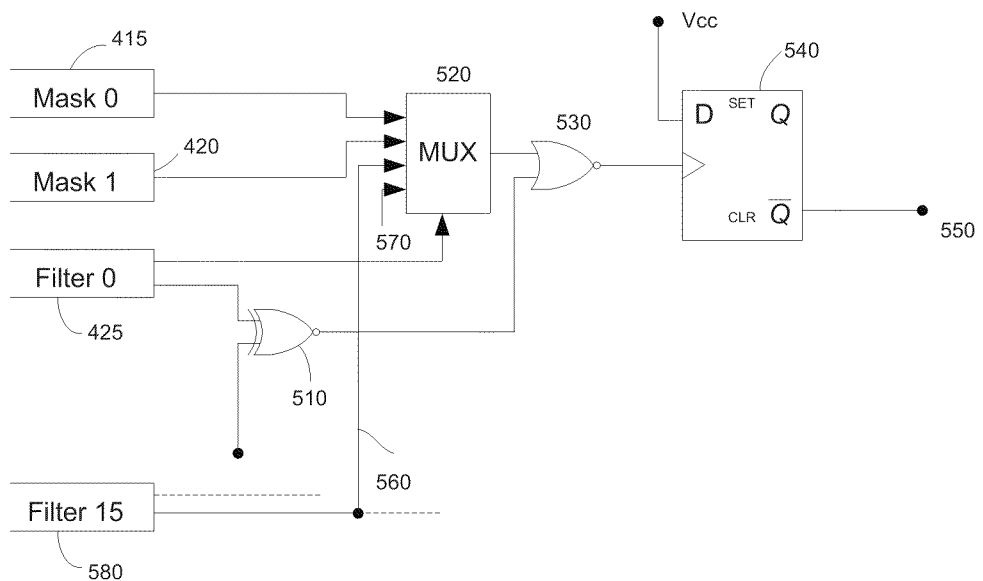
FIG. 9 shows another exemplary embodiment of a bit comparator unit.

FIG. 9 shows another exemplary embodiment of a bit comparator unit 435, 440 with even more functionality in more detail. Again, the details are shown for Bit comparator unit 0 but apply for all other bit comparator units accordingly. The outputs of mask register 415 and 420 are coupled with first and second inputs of a 4:1 multiplexer 520. Additional input 560 and 570 can be provided at the third and fourth input of multiplexer 520. For example, input 560 is coupled with the output of filter register 15 which is designated by numeral 580. Filter register 425 comprises, for example, two additional outputs which are coupled with the select input of multiplexer 520. Multiplexer 520 can have any size, for example, can be expanded to a N:1 multiplexer increasing the number of masks to N. The output of multiplexer 520 is connected to the first input of a NOR gate 530. NOR gate 530 operates as a validation unit indicating whether a comparison result will be used or ignored. The second input of NOR gate 530 is coupled with the output of an Exclusive NOR gate 510 whose first input receives the bit output signal from filter register 425 and whose second input receives the serial data stream from CAN protocol engine 495. The output of NOR gate 530 is coupled with the control input of a D-Flip-Flop 540. The D-input of D-Flip-Flop 540 receives a logical low signal. The acceptance signal is carried at the negating output 550 of D-Flip-Flop 540.

The first comparison stage is formed by Exclusive NOR gate 510. In this stage the identifier bits of the serial bit stream are compared with the respective bits of filter register 425. Exclusive NOR gate 510 only generates a logic "high" at its output if both input signals are identical. Sequencer unit 410 selects the respective bits within filter register 425. Filter register 425 comprises additional data bits which indicate which mask register should be used. In this exemplary embodiment four different values can be selected. Either one of the mask registers 415 or 420 can be selected or a third value can be provided by another filter register, for example filter register 15. The fourth possible selection 570 can be used to indicate that no mask will be used by providing a respective level, for example, a logical "1". Thus, each filter register 425, 430 can be assigned an individual mask function. The selected mask value will be put at the first input of NOR gate 530. If the mask value indicates that the respective bit in filter register 425 should be used NOR gate 530 will operate as a controllable switch and feed the comparison result of Exclusive NOR gate 510 to the control input D-Flip-Flop 540. D-Flip-Flop 540 is used as a register which is preset to "1". If the result of one comparison is negative indicating no match and the respective mask bit is valid D-Flip-Flop 540 will be cleared and no acceptance signal 550 will be generated. D-Flip-Flop 540 thus will be reset to "0". D-Flip-Flop 540 will be preset to "1" again beginning with the next frame to compare another identifier as described above.

Any other type of appropriate logic can be used to implement the comparator. For example, controllable switches, equivalent Boolean operators, etc. can be used. Furthermore, the validation unit can be either put in front of the comparator or after the comparator. The essential function of a validation unit is to either incorporate selected bits or exclude them from comparison.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A controller area network (CAN) controller unit comprising:
    a message assembly buffer receiving a serial bitstream;
    a buffer memory coupled in parallel with said message assembly buffer;
    a CAN control unit coupled with the message assembly buffer and the buffer memory; and
    at least one control register wherein the at least one control register is operable to be programmed to cause the CAN control unit to store a message received in the message assembly register in at least a first and second mode, wherein in the first mode, control information and data payload of the received CAN message are stored in said buffer memory and in the second mode only the data payload of the CAN message is stored in the buffer memory.

2. The unit according to claim 1, wherein said control register comprises a first bit indicating that the second mode is set.

3. The unit according to claim 1, wherein said control register can be programmed to cause the CAN control unit to further store time stamp information along with the control information.

4. The unit according to claim 3, wherein said control register comprises a second bit indicating to store said time stamp information.

5. The unit according to claim 4, wherein said control register comprises a third bit indicating when said time stamp information is generated.

6. The unit according to claim 3, wherein when in said second mode a programming to store said time stamp information is ignored.

7. The unit according to claim 1, wherein said buffer memory is a FIFO memory.

8. The unit according to claim 7, wherein said FIFO memory comprises a plurality of configurable FIFO buffers.

9. The unit according to claim 1, wherein said buffer memory comprises a plurality of configurable buffers.

10. The unit according to claim 9, further comprising control registers for each configurable buffer comprising at least one bit for determining an operating mode of a respective buffer.

11. The unit according to claim 1, further comprising logic coupling a plurality of mask register and a plurality of filter registers with said CAN control unit, wherein said logic generates a signal indicating a valid entry in said message assembly buffer shift register.

12. A method of storing a Controller Area Network (CAN) message comprising the steps of:
    receiving a CAN message in a message assembly buffer of a CAN controller as a serial bitstream, wherein the message assembly buffer is coupled in parallel with a buffer memory of the CAN controller;
    assembling the CAN message;
    determining a storage mode by at least one control register of the CAN controller, wherein in a first mode, a CAN control unit of the CAN controller coupled with the message assembly buffer and the buffer memory is controlled to store control information and data payload of the received CAN message in the buffer memory and in a second mode to only store the data payload of the CAN message in the buffer memory.

13. The method according to claim 12, wherein the CAN message can be a standard CAN message as well as an extended CAN message.

14. The method according to claim 12, wherein the second mode is programmed by setting a first bit in a control register.

15. The method according to claim 12, wherein a plurality of buffer memories are provided and an operating mode of each buffer memory can be programmed in associated control registers.

16. The method according to claim 12, further comprising a third mode in which time stamp information is stored along with the control information and data payload.

17. The method according to claim 16, wherein time stamp information is generated programmably.

18. The method according to claim 16, wherein the third mode is programmed by setting a second bit in a control register.

19. The method according to claim 16, wherein when in said second mode a programming to store said time stamp information is ignored.

20. The method according to claim 12, wherein said buffer memory is a FIFO memory.

21. The method according to claim 20, wherein said FIFO memory comprises a plurality of configurable FIFO buffers and further comprising the step of configuring said FIFO buffers.

22. The method according to claim 12, wherein the step of assembling a CAN message is performed by a message assembly buffer shift register.

23. The method according to claim 12, further comprising the step of generating a validity signal by means of a plurality of mask register and a plurality of filter registers indicating a valid entry in a message assembly buffer register.

24. A microcontroller comprising:
    a central processing unit (CPU);
    a Controller Area Network (CAN) controller comprising:
    a message assembly buffer receiving a serial bitstream;
    a FIFO memory coupled in parallel with said message assembly buffer and with said CPU;
    a CAN control unit coupled with the message assembly and the FIFO memory; and
    a control register wherein the control register is operable to be programmed by said CPU by programming a bit to cause the CAN control unit to store a message received in the message assembly register in at least a first or second mode, wherein in the first mode, control information and data payload of the received CAN message are stored in said FIFO memory and in the second mode only the data payload of the CAN message is stored in the FIFO memory.

25. The microcontroller according to claim 24, further comprising a time capture unit, wherein said control register comprises a second bit which can be programmed to cause the CAN control unit to further store time stamp information from said time capture unit along with the control information.

* * * * *